(12) United States Patent
Vande Haar

(10) Patent No.: US 11,607,956 B2
(45) Date of Patent: Mar. 21, 2023

(54) TRAILING VEHICLE TRACTION CONTROL SYSTEM WITH A DISCONNECT DEVICE

(71) Applicant: DEERE & COMPANY, Moline, IL (US)

(72) Inventor: William J Vande Haar, Janesville, IA (US)

(73) Assignee: DEERE & COMPANY, Moline, IL (US)

( * ) Notice: Subject to any disclaimer, the term of this patent is extended or adjusted under 35 U.S.C. 154(b) by 210 days.

(21) Appl. No.: 16/946,772

(22) Filed: Jul. 6, 2020

(65) Prior Publication Data

US 2021/0129669 A1 May 6, 2021

Related U.S. Application Data

(60) Provisional application No. 62/928,959, filed on Oct. 31, 2019.

(51) Int. Cl.
| | |
|---|---|
| *B60K 28/16* | (2006.01) |
| *B62D 59/04* | (2006.01) |
| *B60K 23/08* | (2006.01) |
| *F16H 59/50* | (2006.01) |

(52) U.S. Cl.
CPC ........ *B60K 28/165* (2013.01); *B60K 23/0808* (2013.01); *B62D 59/04* (2013.01); *F16H 2059/506* (2013.01)

(58) Field of Classification Search
CPC .......................... B60K 28/165; B60K 23/0808
USPC ........................................................ 180/248
See application file for complete search history.

(56) References Cited

U.S. PATENT DOCUMENTS

| | | | | | |
|---|---|---|---|---|---|
| 5,164,903 | A | * | 11/1992 | Lin ....................... | B60K 28/165 180/197 |
| 5,335,746 | A | * | 8/1994 | Betz ...................... | F16D 48/064 180/242 |
| 5,370,588 | A | * | 12/1994 | Sawase .................. | B60K 23/04 475/205 |
| 5,848,664 | A | * | 12/1998 | Kaspar ............... | B60K 23/0808 180/197 |

(Continued)

FOREIGN PATENT DOCUMENTS

| | | | |
|---|---|---|---|
| DE | 202011002786 U1 * | 7/2011 | ........... B60K 17/043 |
| DE | 102017215228 B4 | 10/2020 | |
| DE | 102020205026 A1 * | 10/2021 | |

OTHER PUBLICATIONS

Vande Haar et al., Traction Control System and Method of Controlling a Traction Motor, U.S. Appl. No. 16/284,665, filed Feb. 25, 2019, 18 pages (specification and drawings).

(Continued)

*Primary Examiner* — Jacob B Meyer
*Assistant Examiner* — Myles Harris

(57) ABSTRACT

A traction control system for a trailing vehicle includes an electric machine, a ground engaging apparatus in contact with a ground surface, and a disconnect device connected between the electric machine and the ground engaging apparatus. The traction control system includes one or more speed sensors to determine a differential speed of the disconnect device. The traction control system includes a controller determines when to disengage the disconnect device based in part upon the speed of the ground engaging apparatus exceeding an upper threshold.

20 Claims, 9 Drawing Sheets

(56) References Cited

U.S. PATENT DOCUMENTS

| | | | |
|---|---|---|---|
| 6,817,434 B1 * | 11/2004 | Sweet | B60K 17/3515 180/245 |
| 8,311,693 B2 * | 11/2012 | Wu | B60T 8/17555 303/157 |
| 9,037,346 B2 * | 5/2015 | Keys, II | B60W 30/18145 701/1 |
| 9,227,525 B2 | 1/2016 | Fleege et al. | |
| 9,228,322 B2 | 1/2016 | Keys, II et al. | |
| 9,562,592 B2 | 2/2017 | Rekow et al. | |
| 9,709,969 B2 * | 7/2017 | Anderson | G05B 15/02 |
| 10,099,736 B2 * | 10/2018 | Gugel | B60W 10/08 |
| 10,183,661 B2 | 1/2019 | Burjes | |
| 11,052,769 B2 * | 7/2021 | Vande Haar | B60K 7/0015 |
| 2002/0023791 A1 * | 2/2002 | Kima | B60K 17/046 180/65.6 |
| 2007/0029127 A1 * | 2/2007 | Mori | B60W 30/18145 180/247 |
| 2007/0192011 A1 * | 8/2007 | Piyabongkarn | B60W 30/045 701/70 |
| 2009/0062999 A1 * | 3/2009 | Craig | B60K 17/3515 180/245 |
| 2011/0030505 A1 * | 2/2011 | Hoyle | B60K 23/08 74/665 A |
| 2011/0269593 A1 | 11/2011 | Knowles et al. | |
| 2012/0205182 A1 * | 8/2012 | Rindfleisch | B60T 8/245 180/338 |
| 2013/0076497 A1 * | 3/2013 | Sheidler | B62D 59/04 340/431 |
| 2013/0079980 A1 * | 3/2013 | Vuk | B62D 59/04 701/36 |
| 2013/0225348 A1 * | 8/2013 | Yang | B60K 17/34 475/5 |
| 2013/0260961 A1 * | 10/2013 | Dedo | B60K 17/046 |
| 2013/0275014 A1 * | 10/2013 | Yang | B60K 17/36 701/52 |
| 2016/0160713 A1 * | 6/2016 | Reedy | F16D 13/74 184/6.28 |
| 2017/0015298 A1 * | 1/2017 | Imamura | B60K 17/02 |
| 2017/0248172 A1 * | 8/2017 | Weidemann | F16D 11/14 |
| 2019/0256097 A1 * | 8/2019 | Watt | B62D 53/045 |
| 2019/0263392 A1 * | 8/2019 | Imamura | B60K 28/165 |
| 2020/0269706 A1 | 8/2020 | Vande Haar et al. | |
| 2021/0129829 A1 | 5/2021 | McKinzie et al. | |
| 2021/0261115 A1 * | 8/2021 | Niessen | B60K 1/02 |
| 2021/0284262 A1 * | 9/2021 | Sardes | B60W 10/08 |

OTHER PUBLICATIONS

McKinzie et al., Power Control System with Transmission Transient Boost Function, U.S. Appl. No. 16/670,210, filed Oct. 31, 2019, 37 pages (specification and drawings).

German Search Report issued in application No. DE102020211585.0, dated Jul. 12, 2021, 10 pages.

* cited by examiner

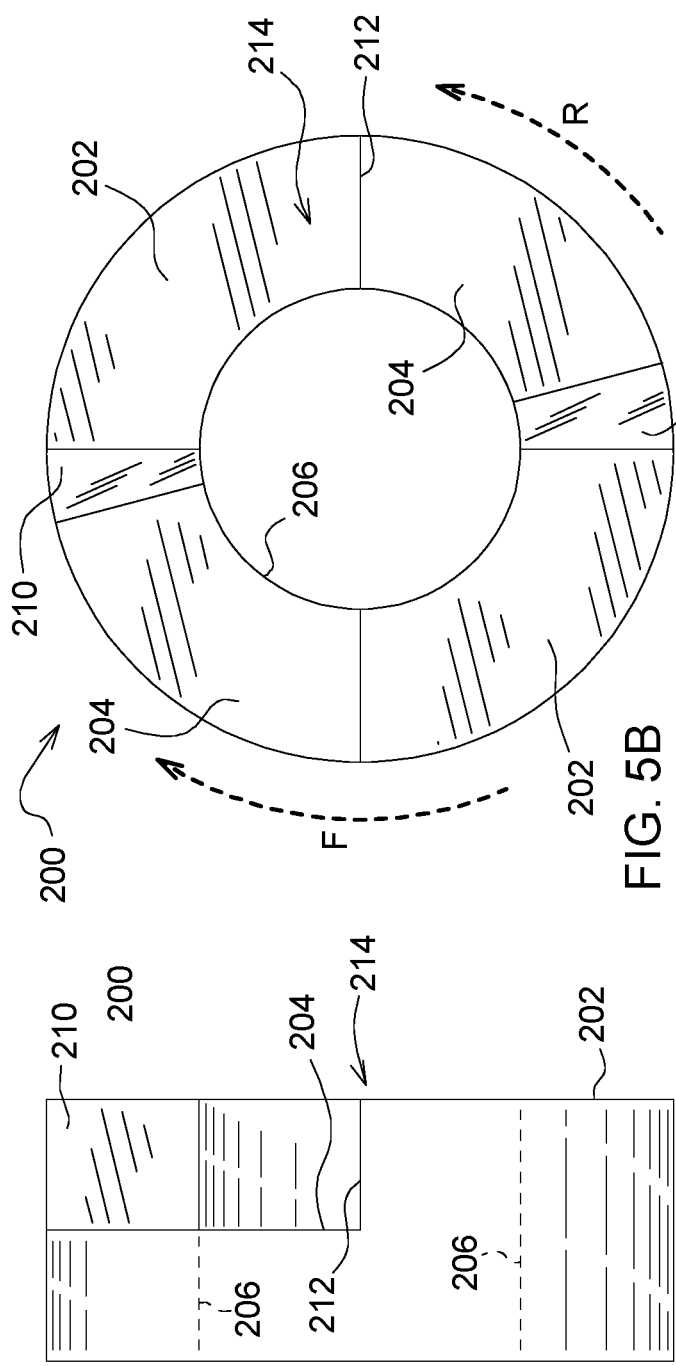
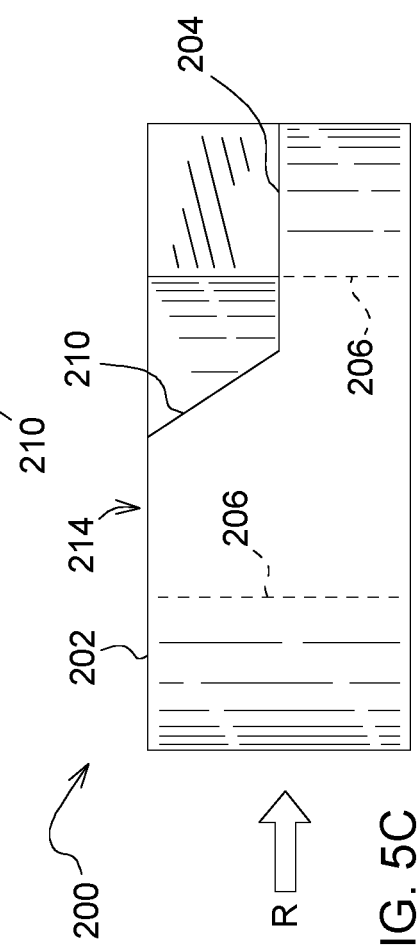
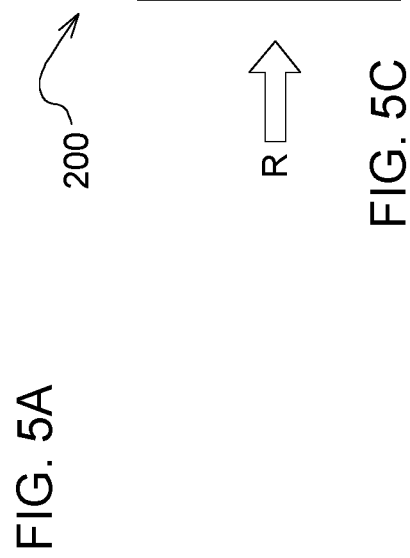
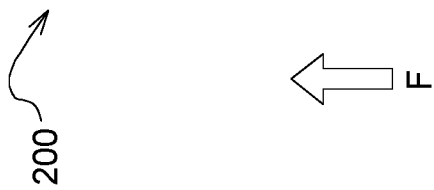
FIG. 5A
FIG. 5B
FIG. 5C

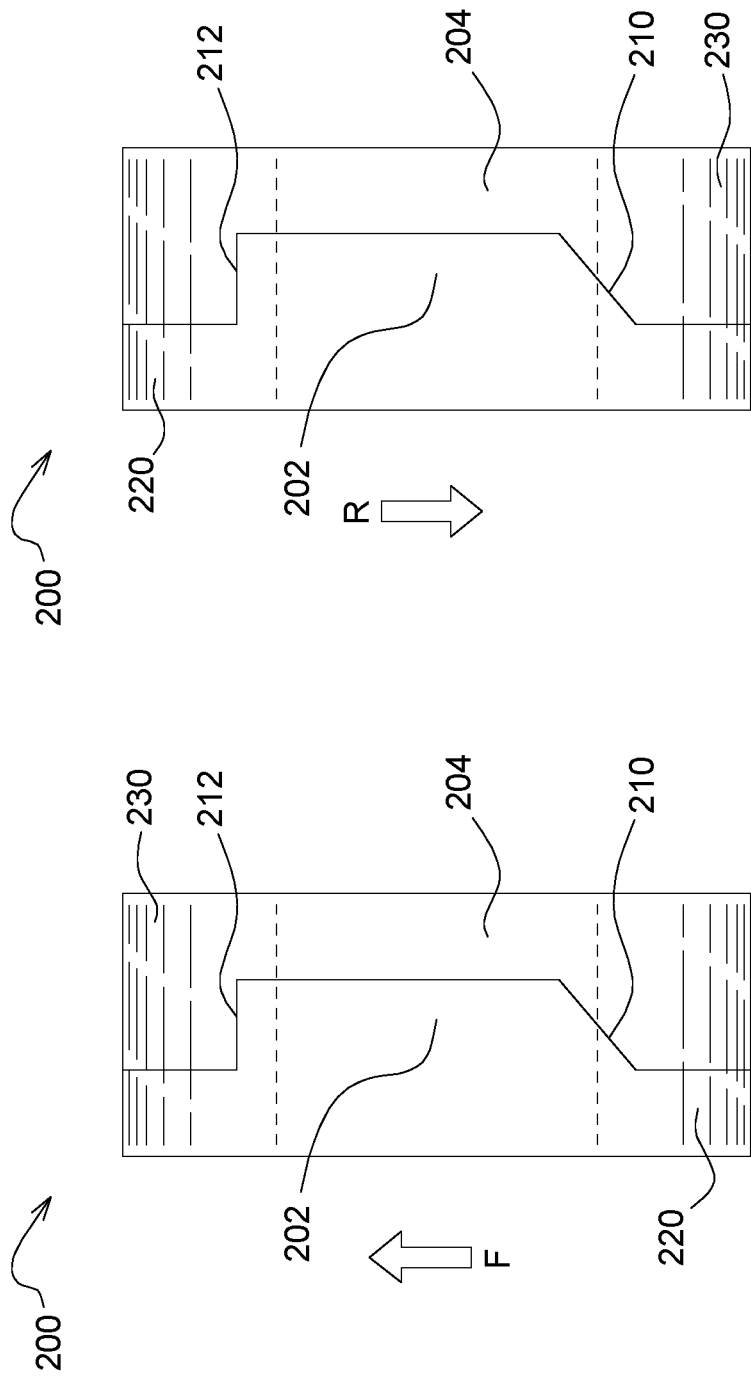

US 11,607,956 B2

TRAILING VEHICLE TRACTION CONTROL SYSTEM WITH A DISCONNECT DEVICE

CROSS-REFERENCE TO RELATED APPLICATIONS

This application claims the benefit of U.S. Provisional Patent Application No. 62/928,959, filed Oct. 31, 2019, which is hereby incorporated by reference in its entirety.

FIELD OF THE DISCLOSURE

The present disclosure relates to trailing vehicle traction control systems providing tractive power to the axles or wheels of trailing or towed vehicles.

BACKGROUND

Work vehicles may include a power source to provide power to a trailing or towed vehicle traction control system. Work vehicles may pull or tow one or more trailing vehicles behind the work vehicle. The work vehicle may encounter demanding situations due to the weight of the trailing vehicles, the terrain conditions, or both, which may result in decreased traction between the work vehicle and the ground surface.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a traction control system having a disconnect device which disconnects an electric machine from a ground engaging apparatus during an overspeed condition.

According to an aspect of the present disclosure, a traction control system for a trailing vehicle includes an electric machine, a ground engaging apparatus in contact with a ground surface, and a disconnect device connected between the electric machine and the ground engaging apparatus. The traction control system includes one or more speed sensors to measure the differential speed of the disconnect device. The traction control system includes a controller determines when to disengage the disconnect device based in part upon the speed of the ground engaging apparatus exceeding an upper threshold.

According to an aspect of the present disclosure, a vehicle traction control system includes a work vehicle having a power source and a trailing vehicle connected to the work vehicle. The trailing vehicle includes one or more ground engaging apparatus. The trailing vehicle includes an electric machine coupled to the one or more ground engaging apparatus. A disconnect device is connected between the electric machine and the ground engaging apparatus. One or more speed sensors measure the differential speed of the disconnect device. The vehicle traction control system includes a controller determining when to disengage the disconnect device based in part upon the speed of the ground engaging apparatus exceeding a threshold.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 5A is a side view of clutch device of a traction control system, according to an embodiment;

FIG. 5B is a front view of clutch device of a traction control system, according to an embodiment;

FIG. 5C is a side view of clutch device of a traction control system, according to an embodiment;

FIG. 6A is a side view of clutch device of a traction control system, according to an embodiment;

FIG. 6B is a side view of clutch device of a traction control system, according to an embodiment;

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
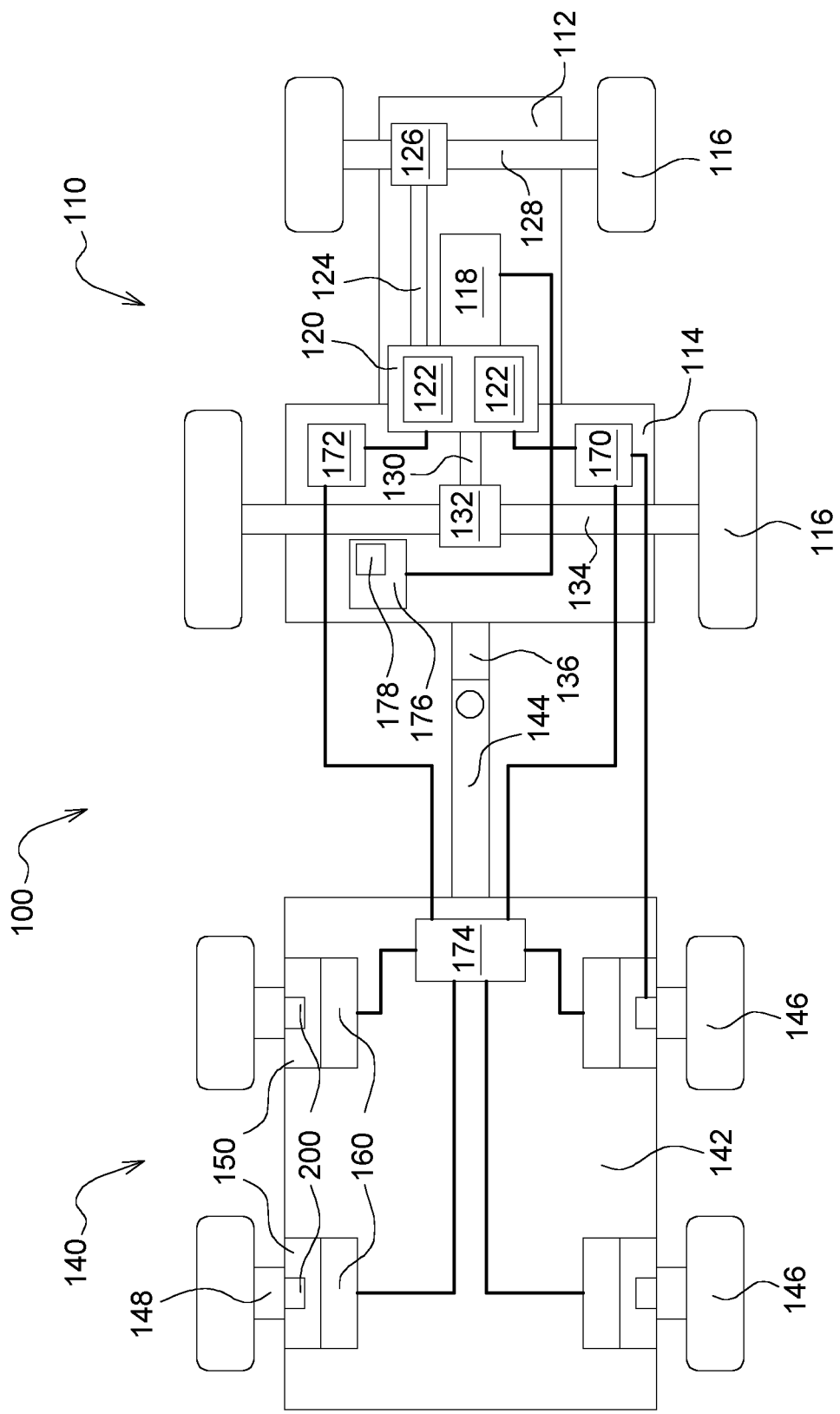
FIG. 1 is a schematic diagram of a traction control system, according to an embodiment.
Figure 2:
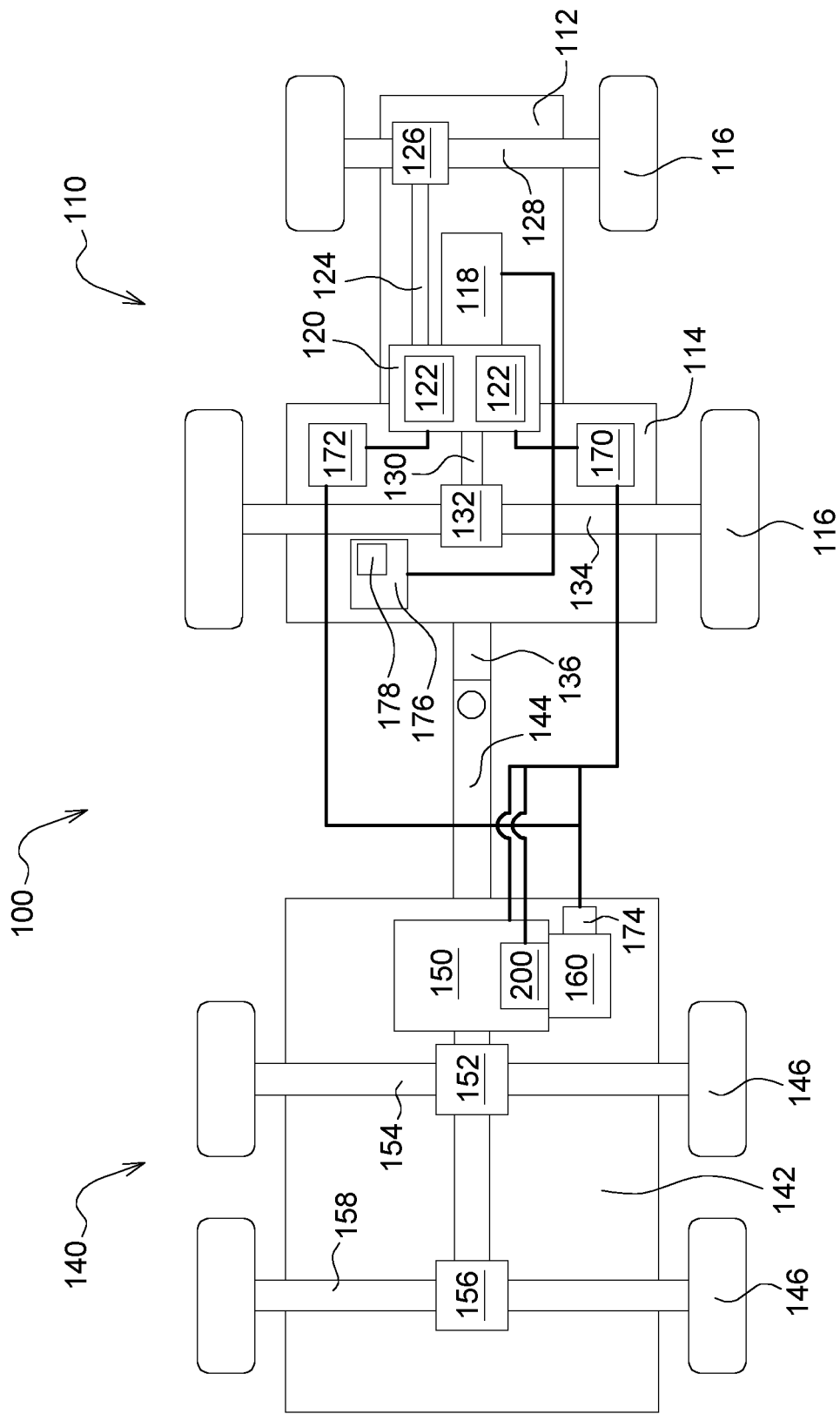
FIG. 2 is a schematic diagram of a traction control system, according to an embodiment.

FIGS. 1 and 2 illustrates a traction control system 100 for a tow vehicle 110 and a towed or trailing vehicle 140. Two or more vehicles connected to one another can be referred to a vehicle train. The tow vehicle 110 can be any work vehicle such as an agricultural tractor for example ("vehicle"). The towed or trailing vehicle 140 can be any agricultural, construction, forestry, or road building equipment such as an implement or trailer pulled or towed behind an agricultural tractor for example ("trailer"). The vehicle 110 includes a frame structure or chassis 112 and an operator station or cab 114 where a machine operator may control the operation of the vehicle 110 or the trailer 140. The vehicle 110 includes one or more ground engaging apparatus 116, for example wheels or tracks. The vehicle includes a power source 118, for example an internal combustion engine or another energy source such a battery for example. The vehicle 110 includes a transmission 120, which connects or couples the power source 118 to one or more ground engaging apparatus 116 via one or more the following drivetrain components: a front drive shaft 124, a front gear set or differential 126, a front axle or axles 128, a rear drive shaft 130, a rear gear set or differential 132, and a rear axle or axles 134. The transmission 120 can include a variety of gear sets and gearing and one or more electric machines 122, such as motor-generator for example. The transmission 120 can be an infinitely or continuously variable transmission with multiple motor-generators 122 coupled to one or more gear sets, such as an epicyclic gear sets for example. The motor-generator 122 can either drive one or more gears within the transmission 120 or be driven to produce electric energy. The vehicle 110 includes a hitch or drawbar 136 used to connect or couple the vehicle 110 to the hitch or drawbar 144 of the trailer 140.

The trailer 140 includes a frame structure or chassis 142 and one or more ground engaging apparatus 146, such as wheels or tracks. The trailer 140 includes one or more axles 148, which may include a gear set such as a final drive or reduction gear set. The trailer 140 can include one or more transmissions or gear sets 150 positioned between one or more electric machines 160 and the axles 148 or the ground engaging apparatus 146. The electric machine 160 can be any type of electric motor. A disconnect device 200, such as a clutch 200, can be positioned between any two of the following components: the electric machine 160, the transmission 150, the axles 148, 154, 158, and the ground engaging apparatus 146. The clutch 200 can be positioned between the transmission 150 and the axles 148. The clutch 200 can engage and disengage the electric machine 160 from the ground engaging apparatus 146. The clutch 200 can be engaged and disengaged by hydraulic, pneumatic, or electric control. The clutch 200 can be engaged and disengaged by a solenoid. The one or more electric machines 160 can be directly connected to the axles 148 or to the ground engaging apparatus 146. Alternatively, the trailer 140 can include an electric machine 160 coupled to a transmission 150, which is coupled to the one or more ground engaging apparatus 146 via one or more of the following drivetrain components: a front differential 152, a front axle or axles 154, a rear differential 156, a rear axle or axles 158, and drive shafts connecting the transmission 150 with the differentials 152, 156.

Figure 3:
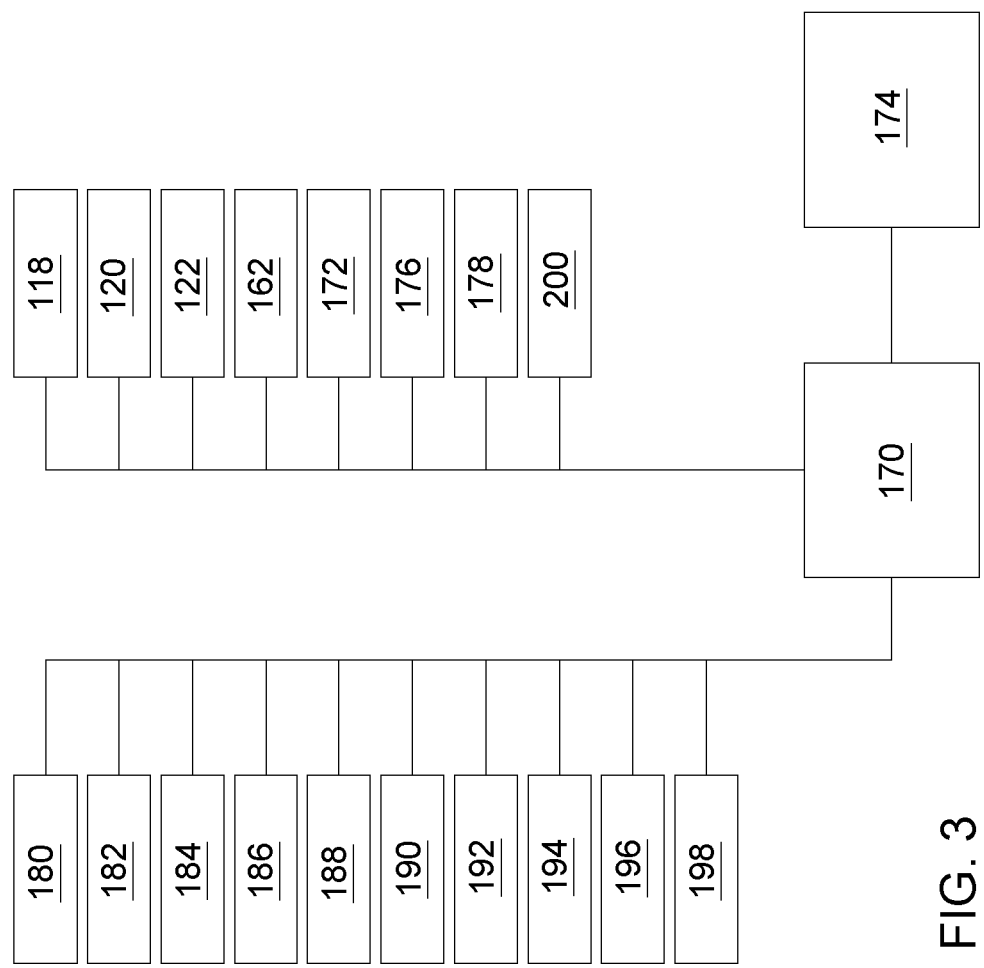
FIG. 3 is a schematic diagram of an electronic control system of a traction control system, according to an embodiment.

With reference to FIGS. 1-3, the traction control system 100 includes an electronic control unit 170, or controller, having one or more microprocessor-based electronic control units or controllers, which perform calculations and comparisons and execute instructions. The controller 170 includes a processor, a core, volatile and non-volatile memory, digital and analog inputs, and digital and analog outputs. The controller 170 can include non-transitory, computer readable memory, such as random-access memory (RAM), read only memory (ROM), or electrically erasable programmable read only memory (EEPROM), which include instructions for execution by the processor. The controller 170 connects to and communicates with various input and output devices including, but not limited to, switches, relays, solenoids, actuators, light emitting diodes (LED's), passive and interactive displays, radio frequency devices (RFD's), sensors, and other controllers. The controller 170 receives communications or signals, via electrically or any suitable electromagnetic communication, from one or more devices, determines an appropriate response or action, and sends communications or signals to one or more devices. The controller 170 can be a microprocessor, an application specific integrated circuit (ASIC), a digital processor, or a programmable logic controller, also known as a PLC or programmable controller.

The controller 170 can connect to and communicate with the vehicle 110 electronic control system through a data bus, such as a CAN bus, or the controller 170 can be a part of the vehicle 110 electronic control system. The traction control system 100 can include a second controller 174 connected to the trailer 140 electronic control system. The traction control system 100 can include a power electronic device 172, such as an inverter, converter, or rectifier. The traction control system 100 can include an operator interface 176 having any number and combination of electronic devices, such as an interactive display. The operator interface 176 can include an operator input 178 providing input to the electronic control systems. The operator input 178 can include on or more of the following: an actual or virtual button, switch, slider, knob, dial, adjustment, or other control. The operator input 178 can provide specific instructions to the electronic control systems.

The traction control system 100 can include a variety of sensors to measure speed, torque, direction, position, location, pitch, roll, and yaw, and other properties of the vehicle 110 and the trailer 140 including, but not limited to: a sensor 180 to measure the speed of the vehicle 110, a sensor 182 to measure the speed of the trailer 140, a sensor 184 to measure the output of the power source 118, a sensor 186 to measure the output of the transmission 120, a sensor 188 to measure the output or input of the motor-generators 122, a sensor 190 to measure the output of the electric machines 160, a sensor 192 to measure the state or condition of the clutch 200, a sensor 194 to measure the pitch, roll, and yaw of the vehicle 110, trailer 140, or both, a sensor 196 to measure the speed of the ground engaging apparatus 146 or the axle 148, and a sensor 198 to measure the speed of the first and second clutch components 220, 230 or the differential speed of the clutch 200 or the speed of the input or output of the transmission 150. The electric machine 160 can include an speed sensor. The controller 170 or 174 can determine the slope of the terrain from the sensor 194. These sensors can be any type of sensors capable of measuring or detecting the respective property. The controller 170 can connect to and communicate with the variety of sensors listed above, the power source 118, the transmission 120, the one or more motor-generators 122, the power electronic device 172, the controller 174, the operator interface 176, and the operator input 178.

Figure 4:
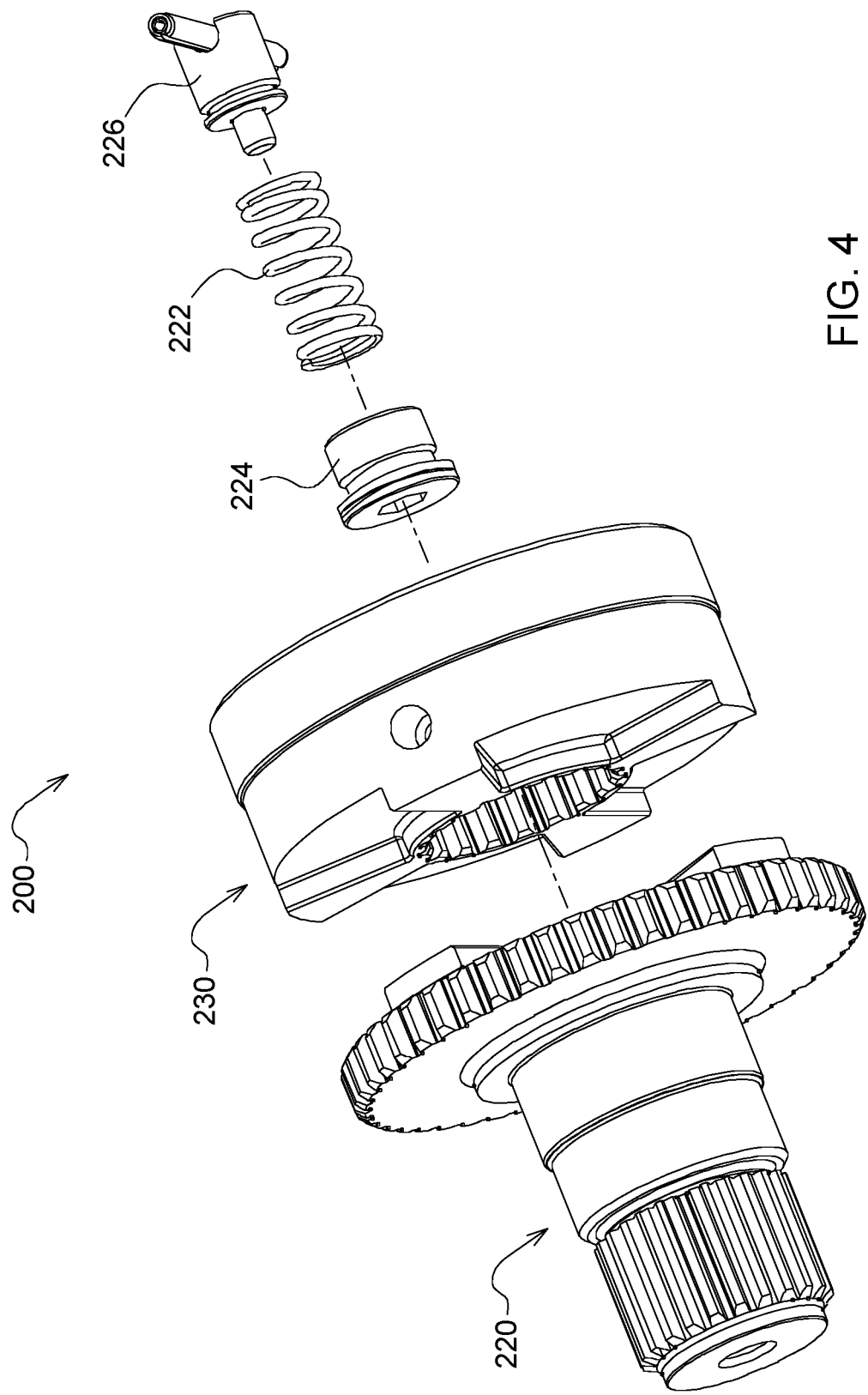
FIG. 4 is a perspective view of a clutch device of a traction control system, according to an embodiment.

With reference to FIGS. 4-6, a clutch 200 can be a jaw clutch, dog clutch, or similar type clutch. The clutch 200 includes a first clutch component 220 and a second clutch component 230, each having alternating protrusions 202 and recesses 204 on the interface surface 214. The clutch 200 includes a spring 222 which is coupled to the first clutch component 220 at one of the spring 222 and to the second clutch component 230 at the other end of the spring 222. The clutch 200 can include a first connector 224 which can connect one end of the spring 222 to the first clutch component 220 and a second connector 226 which can connect the other end of the spring 222 to the second clutch component 230. The spring 222 provides a disengaging force separating the first and second clutch components 220, 230.

The protrusions or dogs 202 are the same size or smaller than the recesses 204 so that the first and second clutch components 220, 230 can fit or mesh together when the clutch 200 is engaged. The first and second clutch components 220, 230 can have the same interface surface 214 so that the protrusions 202 and recesses 204 mesh together as shown in FIGS. 6A and 6B. At the transitions between the protrusions 202 and the recesses 204, the protrusion 202 can include a tapered edge 210 at one end and a vertical edge 212 the other end. The clutch 200 is positioned or aligned so that the force or torque is transferred from the first clutch component 220 to the second clutch component 230 via the vertical edges 212 of the protrusions 202 in the forward direction; and the clutch 200 is positioned or aligned so that the power or torque is transferred from the first clutch component 220 to the second clutch component 230 via the tapered edges 210 of the protrusions 202 in the rearward or reverse direction. In the forward direction, the force transferred from the vertical edges 212 of the first clutch component 220 to the vertical edges 212 of the second clutch component 230 is parallel to the direction of rotation. In the rearward or reverse direction, the force transferred from the tapered edges 210 of the first clutch component 220 to the tapered edges 210 of the second clutch component 230 is at an angle to the direction of rotation thereby creating an axial force urging the first and second clutch components 220, 230 apart. Due to the interaction between the vertical edges 212 in the forward direction and the tapered edges 210 in the reverse direction, more torque can be carried or transferred by the clutch 200 in the forward direction than in the reverse direction.

Figure 7:
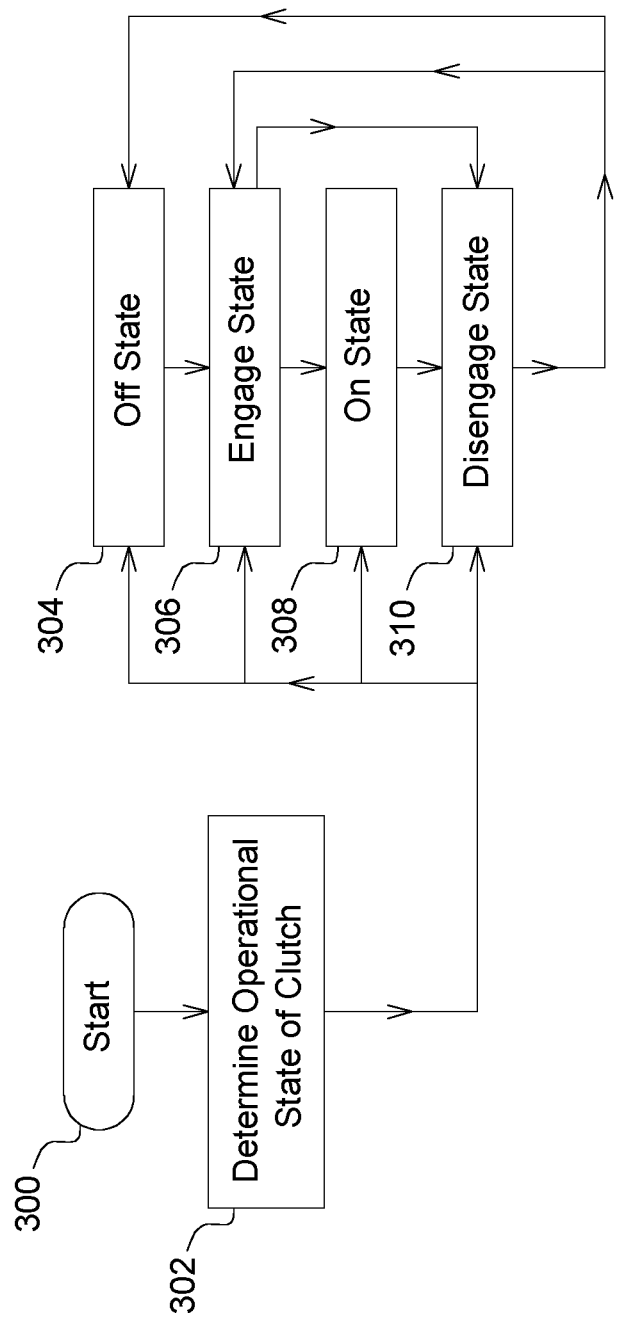
FIG. 7 is a flow diagram for a method of operating the clutch device in a traction control system, according to an embodiment.

FIG. 7 illustrates a method of operating a traction control system 100, which may be implemented in one or more of the embodiments described herein and depicted in the various FIGURES. At step 300, the method starts.

At step 302, the operational state or condition of the clutch 200 is determined. A controller 170 or 174 can perform this determination. The clutch 200 can have four conditions or states: Off, Engage, On, and Disengage.

At step 304, the clutch 200 is in an off state. The clutch 200 is disengaged and the electric machine 160 is not powered. The controller 170 or 174 can determine the clutch 200 is disengaged via the relative positions and speeds of the first and second clutch components 220, 230. This state can continue until the traction control system 100 determines to engage the clutch 200. The speed of the first clutch component 220 can be measured by a speed sensor 192 or 198 or it can be calculated from the speed of the electric machine 160 or the speed of the transmission 150. The speed of the second clutch component 230 can be measured by a speed sensor 192 or 198 or it can be calculated from the speed of the ground engaging apparatus 146 or the axle 148.

At step 306, the clutch 200 is in an engage state. This is a dynamic state with the traction control system 100, via the controller 170 or 174, commanding the clutch 200 to be engaged. The controller 170 or 174 first determines the conditions of the traction control system 100 including, but not limited to, the speed of the trailer 140, the speed of the electric machine 160, the speed of the and speeds of the first and second clutch components 220, 230, the load on the power source 118 of the vehicle 110, the load on the transmission 120 or other drivetrain components of the vehicle 110, and the slope of the terrain. If the conditions are within the acceptable limits, then the controller 170 or 174 commands the clutch 200 to be engaged. This state ends when the clutch 200 is engaged. Alternatively, the traction control system 100 could command the clutch 200 to disengage before this step is complete; in this condition, the method proceeds to step 310 instead of step 308.

At step 308, the clutch 200 is now engaged. The controller 170 or 174 can determine the clutch 200 is engaged via the relative positions and differential speed of the first and second clutch components 220, 230. The traction control system 100 can power and control the electric machines 160 as desired.

At step 310, the clutch 200 is in a disengage state. This is a dynamic state with the traction control system 100, via the controller 170 or 174, commanding the clutch 200 to be disengaged. The traction control system 100 can determine to disengage the clutch 200 because the traction control system 100 determines the additional tractive effort from the ground engaging apparatus 146 of the trailer 140 is not required or because the traction control system 100 determines there is a potential for an overspeed condition of the electric machines 160, for example from the trailer 140 traveling down an incline or slope. The controller 170 or 174 can determine to disengage the clutch 200 based in part upon the speed of the trailer 140, the load on the power source 118 of the vehicle 110, the load on the transmission 120 or other drivetrain components of the vehicle 110, and the slope of the terrain. This state ends when the clutch 200 is disengaged. Alternatively, the traction control system 100 could command the clutch 200 to engage before this step is complete. In that condition, the method proceeds back to step 306 instead of step 304.

Figure 8:
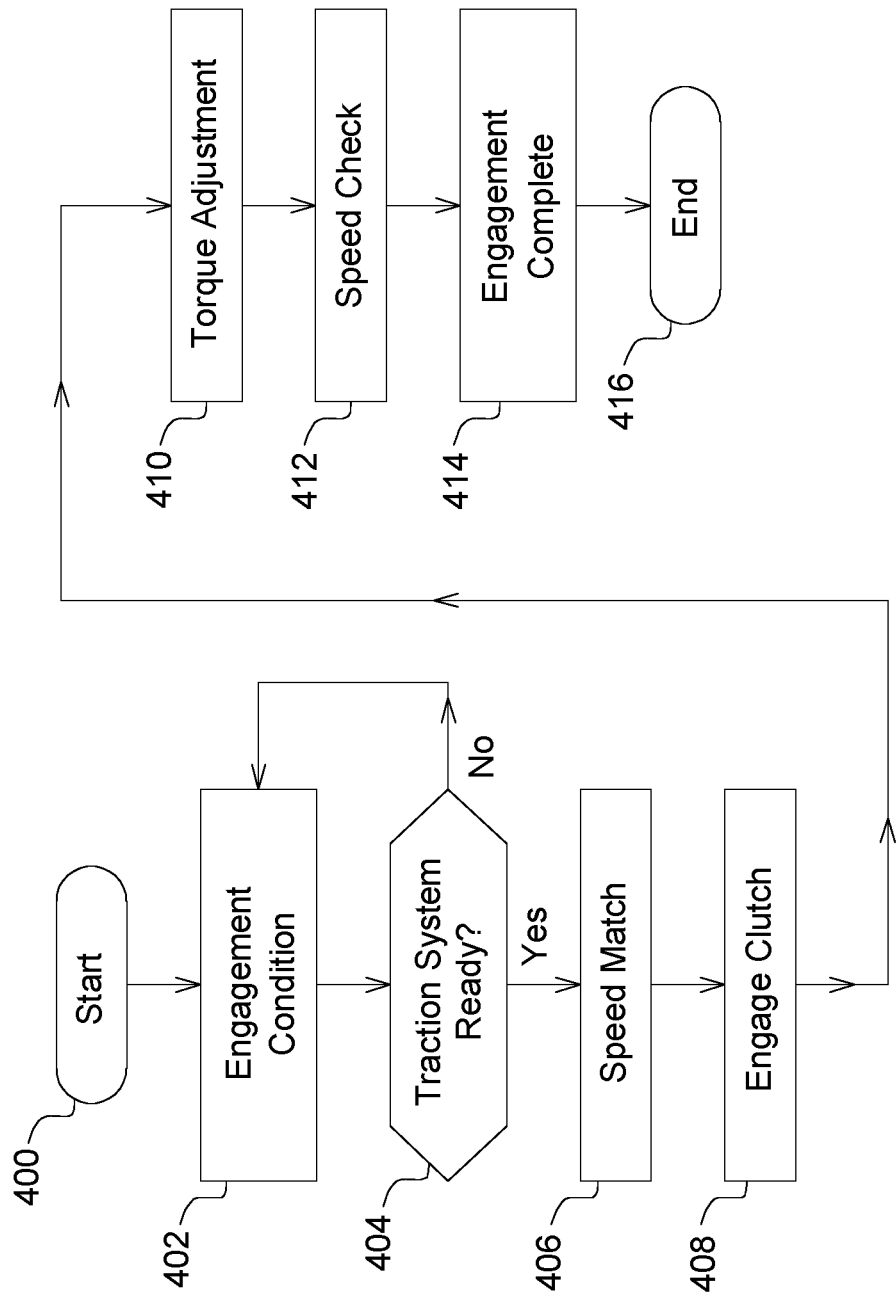
FIG. 8 is a flow diagram for a method of operating the clutch device in a traction control system, according to an embodiment.

FIG. 8 illustrates a method of engaging a clutch 200 in a traction control system 100, which may be implemented in one or more of the embodiments described herein and depicted in the various FIGURES. This method can be a sub-routine of step 306 in FIG. 7. At step 400, the method starts.

At step 402, the traction control system 100, via the controller 170 or 174, determines whether to engage the clutch 200 because additional tractive effort is needed or desired from the ground engaging apparatus 146 of the trailer 140. This condition could be caused by slippage between the ground engaging apparatus 116 of the vehicle 110 and a ground surface or due to the load on the transmission 120 or other drivetrain components. This condition could also be caused by the speed of the trailer 140 operating below a lower threshold, such as a specified or desired speed of the vehicle 110.

At step 404, the traction control system 100 determines whether to command the clutch 200 to engage. The traction control system 100 determines whether one or more of the following are within acceptable ranges: the speed of the trailer 140, the speed of the vehicle 110, the slip of the ground engaging apparatus 116, the slip of the ground engaging apparatus 146, the load on the power source 118 of the vehicle 110, the load on the transmission 120 or other drivetrain components of the vehicle 110, and the slope of the terrain as measured by the pitch and roll of the vehicle 110, the trailer 140, or both. If the required values are within the acceptable ranges, then the traction control system 100 commands the clutch 200 to engage.

At step 406, the controller 170 or 174 operates the electric machine 160 to create a small differential speed between the first and second clutch components 220, 230. The first clutch component 220 is coupled to and rotates based upon the speed of the electric machine 160 and the second clutch component 230 is coupled to and rotates based upon either the axle 148, 154, 158 or the ground engaging apparatus 146. The differential speed is large enough to allow the first and second clutch components 220, 230 to mesh, but small enough to prevent unwanted torque fluctuations.

At step 408, when the controller 170 or 174 determines the differential speed of the clutch 200 is within an acceptable range, the controller 170 or 174 commands the clutch 200 to engage via hydraulics, pneumatics, or electrical engagement system via a solenoid for example.

At step 410, the controller 170 or 174 commands a torque adjustment or joggle, both positive and negative, as the clutch 200 is engaging. This facilitates the meshing of the first and second clutch components 220, 230.

At step 412, the controller 170 or 174 continues to monitor the speed differential of the clutch 200. When the speeds of the first and second clutch components 220, 230 match, then the clutch 200 is engaged. Additionally, or alternatively, the relative position of the first and second clutch components 220, 230 can provide confirmation of the clutch 200 engagement.

At step 414, the clutch 200 is engaged and the electric machine 160 is providing tractive power to the ground engaging apparatus 146.

At step 416, the method of engaging a clutch 200 in a traction control system 100 is complete, according to one embodiment. In other embodiments, one or more of these steps or operations may be omitted, repeated, or re-ordered and still achieve the desired results.

Figure 9:
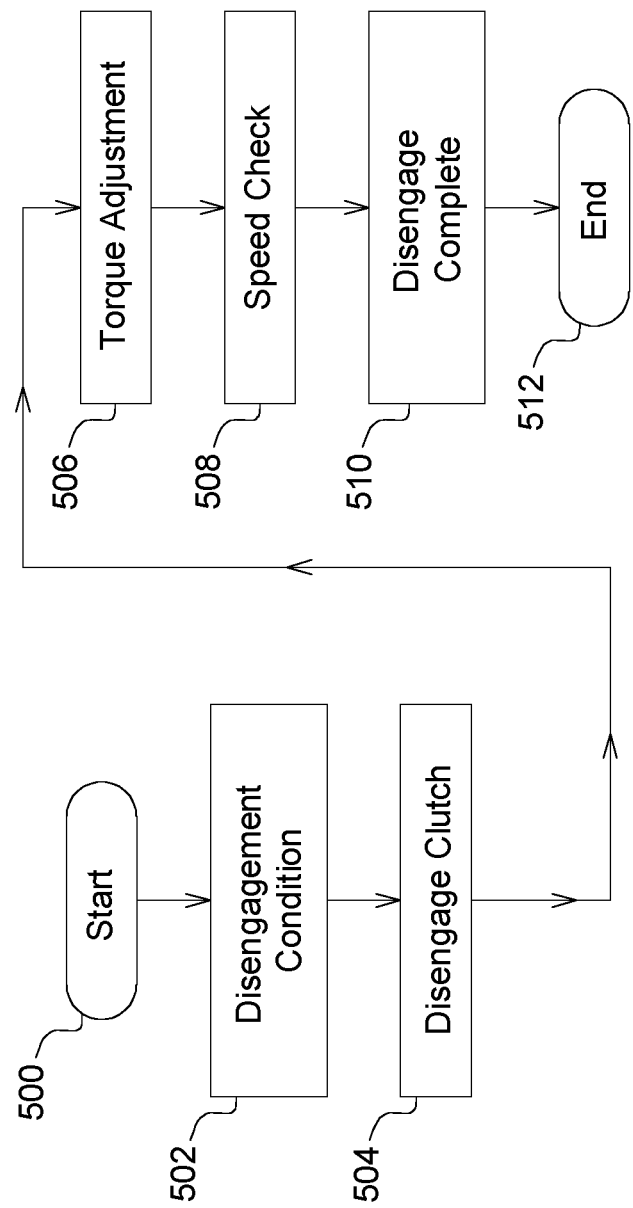
FIG. 9 is a flow diagram for a method of operating the clutch device in a traction control system, according to an embodiment.

FIG. 9 illustrates a method of disengaging a clutch 200 in a traction control system 100, which may be implemented in one or more of the embodiments described herein and depicted in the various FIGURES. This method can be a sub-routine of step 310 in FIG. 7. At step 500, the method starts.

At step 502, the traction control system 100, via the controller 170 or 174, determines whether to disengage the clutch 200 because additional tractive effort is not needed or desired from the ground engaging apparatus 146 of the trailer 140. This condition could be caused by decreased load on the power source 118, the transmission 120, or other drivetrain components of the vehicle 110 or trailer 140. This condition could also be caused by a decrease in the slip of the ground engaging apparatus 116, the slip of the ground engaging apparatus 146, or the slope of the terrain as measured by the pitch and roll of the vehicle 110, the trailer 140, or both. This condition could also be caused by an overspeed condition of the trailer 140 so that the controller 170 or 174 disengages the clutch 200 to prevent the electric machine 160 from exceeding a threshold speed, such as a maximum recommended or allowable speed for example. The threshold speed could be lower than the maximum recommended or allowable speed of the electric machine 160. An overspeed condition of the trailer 140 can be caused by the trailer 140 traveling down an incline slope and traveling faster than the electric machine 160 speed.

At step 504, when the controller 170 or 174 determines any threshold has been exceeded, the controller 170 or 174 commands the clutch 200 to disengage via hydraulics, pneumatics, or electrical engagement system via a solenoid for example.

At step 506, the controller 170 or 174 commands a torque adjustment or joggle, both positive and negative, as the clutch 200 is disengaging. This facilitates the disconnection of the first and second clutch components 220, 230. The tapered edges 210 of the clutch 200 also facilitates the disconnection of the first and second clutch components 220, 230. When the trailer 140 is traveling in the forward direction and approaches an overspeed condition, the second clutch component 230 can exert a rotation force back to the first clutch component 220 via the tapered edges 210 which results in an axial force assisting in the separation of the first and second clutch components 220, 230 and disengaging the clutch 200. An overspeed condition can occur if the vehicle 110 and trailer 140 are traveling on a downward incline, especially on a steep grade.

At step 508, the controller 170 or 174 continues to monitor the speed differential of the clutch 200. When the speeds of the first and second clutch components 220, 230 differ by a specified amount, then the clutch 200 is disengaged. Additionally, or alternatively, the relative position of the first and second clutch components 220, 230 can provide confirmation that the clutch 200 disengaged.

At step 510, the clutch 200 is disengaged and the electric machine 160 is decoupled from the ground engaging apparatus 146.

At step 512, the method of disengaging a clutch 200 in a traction control system 100 is complete, according to one embodiment. In other embodiments, one or more of these steps or operations may be omitted, repeated, or re-ordered and still achieve the desired results.

Without in any way limiting the scope, interpretation, or application of the claims appearing below, a technical effect of one or more of the example embodiments or implementations disclosed herein is a traction control system having a disconnect device to prevent an overspeed condition of an electric machine. The disconnect device can be a jaw or dog clutch positioned between the electric machine and a ground engaging apparatus. The disconnect device can disconnect the electric machine from the ground engaging apparatus when the speed of the ground engaging apparatus exceeds a threshold.

The terminology used herein is for describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A traction control system for a tow vehicle towing a trailing vehicle comprising:

an electric machine;
a ground engaging apparatus of the trailing vehicle in contact with a ground surface;
a disconnect device connected between the electric machine and the ground engaging apparatus;
one or more speed sensors to measure a differential speed of the disconnect device;
a first sensor to measure a speed of the trailing vehicle;
a second sensor to measure an output of a power source of the tow vehicle;
a third sensor to measure an output of a transmission of the tow vehicle;
a fourth sensor to measure an output of the electric machine;
a fifth sensor to measure a pitch, roll, and yaw of one of the tow vehicle and the trailing vehicle; and
a controller configured to determine a state of the disconnect device based on the one or more speed sensors;
the controller configured to determine a speed of the trailing vehicle based on the first sensor;
the controller configured to determine a load on the power source of the tow vehicle based on the second sensor;
the controller configured to determine a load on the transmission of the tow vehicle based on the third sensor;
the controller configured to determine a speed of the electric machine based on the fourth sensor;
the controller configured to determine a slope of the ground surface based on the fifth sensor;
the controller configured to engage the disconnect device based in part upon the speed of the trailing vehicle, the speed of the electric machine, the state of the disconnect device, the load on the power source of the tow vehicle, the load on the transmission of the tow vehicle, and the slope of the ground surface; and
the controller configured to determine when to disengage the disconnect device based in part upon the speed of the trailing vehicle, the load on a power source of the tow vehicle, the load on a transmission of the tow vehicle, and the slope of the ground surface.

2. The traction control system of claim 1, further comprising:
a gear set connected between the ground engaging apparatus and the electric machine, the disconnect device being connected between the gear set and the ground engaging apparatus, wherein the gear set comprises a transmission and an axle, the disconnect device being positioned between the transmission and the axle.

3. The traction control system of claim 1, wherein an upper threshold is based in part upon a maximum allowable speed of the electric machine.

4. The traction control system of claim 1, wherein the controller determines when to disengage the disconnect device based in part upon a decrease in slip of the ground engaging apparatus of the tow vehicle.

5. The traction control system of claim 1, wherein the controller determines when to engage the disconnect device based in part upon slippage of a ground engaging apparatus of the tow vehicle.

6. The traction control system of claim 1, wherein the controller commands a positive and negative torque adjustment of the electric machine as the disconnect device is disengaging.

7. The traction control system of claim 1, wherein the disconnect device is a dog clutch comprising a first clutch component and a second clutch component each component comprising a plurality of alternating protrusions and recesses, the protrusions having a vertical edge at one end and a tapered edge at the other end, wherein the contact between the vertical edges of the protrusions on the first clutch component and the second clutch component transfer torque from the electric machine to the ground engaging apparatus in the forward direction, and wherein the contact between the tapered edges of the protrusions on the first clutch component and the second clutch component transfer torque from the electric machine to the ground engaging apparatus in the reverse direction.

8. The traction control system of claim 1, wherein the controller is configured to disengage the disconnect device before engagement is complete based in part upon the speed of the trailing vehicle, the load on a power source of the tow vehicle, the load on a transmission of the tow vehicle, and the slope of the ground surface.

9. The traction control system of claim 1, wherein the controller is configured to engage the disconnect device before disengagement is complete based in part upon the speed of the trailing vehicle, the speed of the electric machine, the state of the disconnect device, the load on the power source of the tow vehicle, the load on the transmission of the tow vehicle, and the slope of the ground surface.

10. The traction control system of claim 1, wherein the controller is configured to disengage the disconnect device before engagement is complete based in part upon the speed of the trailing vehicle, the load on a power source of the tow vehicle, the load on a transmission of the tow vehicle, and the slope of the ground surface, and the controller is configured to engage the disconnect device before disengagement is complete based in part upon the speed of the trailing vehicle, the speed of the electric machine, the state of the disconnect device, the load on the power source of the tow vehicle, the load on the transmission of the tow vehicle, and the slope of the ground surface.

11. A vehicle traction control system comprising:
a work vehicle having a power source and a transmission;
a trailing vehicle connected to the work vehicle, the trailing vehicle having one or more ground engaging apparatus in contact with a ground surface;
an electric machine coupled to the one or more ground engaging apparatus;
a disconnect device connected between the electric machine and the ground engaging apparatus;
one or more speed sensors to measure a differential speed of the disconnect device;
a first sensor to measure a speed of the trailing vehicle;
a second sensor to measure an output of a power source of the work vehicle;
a third sensor to measure an output of a transmission of the work vehicle;
a fourth sensor to measure an output of the electric machine;
a fifth sensor to measure a pitch, roll, and yaw of one of the work vehicle and the trailing vehicle; and
a controller configured to determine a state of the disconnect device based on the one or more speed sensors;
the controller configured to determine a speed of the trailing vehicle based on the first sensor;
the controller configured to determine a load on the power source of the work vehicle based on the second sensor;
the controller configured to determine a load on the transmission of the work vehicle based on the third sensor;
the controller configured to determine a speed of the electric machine based on the fourth sensor;

the controller configured to determine a slope of the ground surface based on the fifth sensor;

the controller configured to engage the disconnect device based in part upon the speed of the trailing vehicle, the speed of the electric machine, the state of the disconnect device, the load on the power source of the work vehicle, the load on the transmission of the work vehicle, and the slope of the ground surface; and the controller configured to determine when to disengage the disconnect device based in part upon the speed of the trailing vehicle, the load on the power source of the work vehicle, the load on the transmission of the work vehicle, and the slope of the ground surface.

12. The vehicle traction control system of claim 11, further comprising:

a gear set connected between the ground engaging apparatus and the electric machine, the disconnect device being connected between the gear set and the ground engaging apparatus, wherein the gear set comprises a transmission and an axle, the disconnect device being positioned between the transmission and the axle.

13. The vehicle traction control system of claim 11, wherein an upper threshold is based in part upon a maximum allowable speed of the electric machine.

14. The vehicle traction control system of claim 11, wherein the controller determines when to disengage the disconnect device based in part upon a decrease in slip of one or more ground engaging apparatus of the work vehicle.

15. The vehicle traction control system of claim 11, wherein the controller determines when to engage the disconnect device based in part upon slippage of one or more ground engaging apparatus of the work vehicle.

16. The vehicle traction control system of claim 11, wherein the controller commands a positive and negative torque adjustment of the electric machine as the disconnect device is disengaging.

17. The vehicle traction control system of claim 11, wherein the disconnect device is a dog clutch comprising a first clutch component and a second clutch component each component comprising a plurality of alternating protrusions and recesses, the protrusions having a vertical edge at one end and a tapered edge at the other end, wherein the contact between the vertical edges of the protrusions on the first clutch component and the second clutch component transfer torque from the electric machine to the ground engaging apparatus in the forward direction, and wherein the contact between the tapered edges of the protrusions on the first clutch component and the second clutch component transfer torque from the electric machine to the ground engaging apparatus in the reverse direction.

18. The vehicle traction control system of claim 11, wherein the controller is configured to disengage the disconnect device before engagement is complete based in part upon the speed of the trailing vehicle, the load on the power source of the work vehicle, the load on the transmission of the work vehicle, and the slope of the ground surface.

19. The vehicle traction control system of claim 11, wherein the controller is configured to engage the disconnect device before disengagement is complete based in part upon the speed of the trailing vehicle, the speed of the electric machine, the state of the disconnect device, the load on the power source of the work vehicle, the load on the transmission of the work vehicle, and the slope of the ground surface.

20. The vehicle traction control system of claim 11, wherein the controller is configured to disengage the disconnect device before engagement is complete based in part upon the speed of the trailing vehicle, the load on the power source of the work vehicle, the load on the transmission of the work vehicle, and the slope of the ground surface, and the controller is configured to engage the disconnect device before disengagement is complete based in part upon the speed of the trailing vehicle, the speed of the electric machine, the state of the disconnect device, the load on the power source of the work vehicle, the load on the transmission of the work vehicle, and the slope of the ground surface.

* * * * *